(12) United States Patent
Safronov et al.

(10) Patent No.: US 11,562,292 B2
(45) Date of Patent: Jan. 24, 2023

(54) METHOD OF AND SYSTEM FOR GENERATING TRAINING SET FOR MACHINE LEARNING ALGORITHM (MLA)

(71) Applicant: YANDEX EUROPE AG, Lucerne (CH)

(72) Inventors: Aleksandr Valerievich Safronov, Moscow (RU); Aleksandra Aleksandrovna Antonova, Moscow (RU); Aleksey Vladimirovich Misyurev, Moscow (RU); Vladimir Aleksandrovich Platonov, Barnaul (RU); Eduard Mechislavovich Volynets, Minsk (BY)

(73) Assignee: YANDEX EUROPE AG, Lucerne (CH)

( * ) Notice: Subject to any disclaimer, the term of this patent is extended or adjusted under 35 U.S.C. 154(b) by 646 days.

(21) Appl. No.: 16/571,847

(22) Filed: Sep. 16, 2019

(65) Prior Publication Data

US 2020/0210891 A1 Jul. 2, 2020

(30) Foreign Application Priority Data

Dec. 29, 2018 (RU) ............................ RU2018147501

(51) Int. Cl.
*G06N 20/00* (2019.01)
*G06F 16/33* (2019.01)
(52) U.S. Cl.
CPC ......... *G06N 20/00* (2019.01); *G06F 16/3349* (2019.01)
(58) Field of Classification Search
CPC .... G06N 20/00; G06F 16/3349; G06F 16/953

USPC .......................................................... 706/12
See application file for complete search history.

(56) References Cited

U.S. PATENT DOCUMENTS

| | | | |
|---|---|---|---|
| 6,006,225 A | * | 12/1999 | Bowman ............... G06F 16/951 |
| | | | 707/999.005 |
| 6,185,558 B1 | | 2/2001 | Bowman et al. |
| 6,189,002 B1 | | 2/2001 | Roitblat |
| 6,269,368 B1 | | 7/2001 | Diamond |
| 6,701,311 B2 | | 3/2004 | Biebesheimer et al. |

(Continued)

FOREIGN PATENT DOCUMENTS

| | | |
|---|---|---|
| CN | 106095983 A | 11/2016 |
| JP | 2008181186 A | 8/2008 |

(Continued)

OTHER PUBLICATIONS

Office Action with regard to the U.S. Appl. No. 16/277,088 dated Feb. 15, 2022.

(Continued)

*Primary Examiner* — Hicham Skhoun
(74) *Attorney, Agent, or Firm* — BCF LLP

(57) ABSTRACT

There is disclosed a computer-implemented method and system for generating a set of training objects for training a machine learning algorithm (MLA) to determine query similarity based on textual content thereof, the MLA executable by the system. The method comprises retrieving, from a search log database of the system, a first query and other queries with associated search results. The method then comprises selecting a subset of query pairs such that: a query difference in queries in the pair is minimized and a results difference in respective search results is maximized.

20 Claims, 5 Drawing Sheets

(56) References Cited

U.S. PATENT DOCUMENTS

| | | | |
|---|---|---|---|
| 6,738,764 B2 | 5/2004 | Mao et al. | |
| 7,296,016 B1* | 11/2007 | Farach-Colton | G06F 16/9535 |
| | | | 707/999.005 |
| 7,523,105 B2 | 4/2009 | Wen et al. | |
| 7,574,426 B1* | 8/2009 | Ortega | G06F 16/3329 |
| 7,577,643 B2 | 8/2009 | Dominowska et al. | |
| 7,603,348 B2 | 10/2009 | He et al. | |
| 7,689,585 B2 | 3/2010 | Zeng et al. | |
| 7,877,385 B2 | 1/2011 | Craswell et al. | |
| 7,877,404 B2 | 1/2011 | Achan et al. | |
| 7,895,235 B2 | 2/2011 | Baeza-Yates et al. | |
| 7,921,119 B2 | 4/2011 | Bowman et al. | |
| 7,958,115 B2 | 6/2011 | Kraft | |
| 7,958,158 B2 | 6/2011 | Bestgen et al. | |
| 8,086,619 B2 | 12/2011 | Haahr et al. | |
| 8,135,698 B2 | 3/2012 | Dettinger et al. | |
| 8,145,623 B1 | 3/2012 | Mehta et al. | |
| 8,156,129 B2 | 4/2012 | Zhou et al. | |
| 8,214,363 B2 | 7/2012 | Chaudhary | |
| 8,239,334 B2 | 8/2012 | Yan et al. | |
| 8,239,370 B2 | 8/2012 | Wong et al. | |
| 8,321,448 B2 | 11/2012 | Zeng et al. | |
| 8,359,282 B2 | 1/2013 | Bai et al. | |
| 8,392,436 B2 | 3/2013 | Bai et al. | |
| 8,423,547 B2 | 4/2013 | Liu et al. | |
| 8,452,758 B2 | 5/2013 | Tong et al. | |
| 8,463,595 B1 | 6/2013 | Rehling et al. | |
| 8,533,130 B2 | 9/2013 | Ershov | |
| 8,543,668 B1 | 9/2013 | Long | |
| 8,606,786 B2 | 12/2013 | Rounthwaite et al. | |
| 8,612,367 B2 | 12/2013 | Xu et al. | |
| 8,626,758 B2 | 1/2014 | Alspector et al. | |
| 8,645,390 B1 | 2/2014 | Oztekin et al. | |
| 8,655,868 B2 | 2/2014 | Parikh et al. | |
| 8,655,872 B2 | 2/2014 | Kraft | |
| 8,719,257 B2 | 5/2014 | Rangan | |
| 8,762,365 B1* | 6/2014 | Pantel | G06F 16/951 |
| | | | 707/710 |
| 8,775,442 B2 | 7/2014 | Moore et al. | |
| 8,788,477 B1 | 7/2014 | Jung et al. | |
| 8,825,571 B1* | 9/2014 | Alfonseca | G06N 5/022 |
| | | | 706/12 |
| 8,898,156 B2 | 11/2014 | Xu et al. | |
| 9,009,146 B1 | 4/2015 | Lopatenko et al. | |
| 9,009,148 B2 | 4/2015 | Gao et al. | |
| 9,064,007 B1 | 6/2015 | Jacobsson et al. | |
| 9,098,571 B2 | 8/2015 | Achuthan et al. | |
| 9,104,733 B2 | 8/2015 | Gao et al. | |
| 9,183,323 B1 | 11/2015 | Shaw | |
| 9,251,292 B2 | 2/2016 | Cheng et al. | |
| 9,400,838 B2 | 7/2016 | Musgrove et al. | |
| 9,477,654 B2 | 10/2016 | He et al. | |
| 9,507,861 B2 | 11/2016 | Ali et al. | |
| 9,519,859 B2 | 12/2016 | Huang et al. | |
| 9,535,960 B2 | 1/2017 | Guo et al. | |
| 9,633,017 B2 | 4/2017 | Yi et al. | |
| 9,659,248 B1 | 5/2017 | Barbosa et al. | |
| 9,715,660 B2 | 7/2017 | Parada et al. | |
| 9,720,904 B2 | 8/2017 | Ikawa et al. | |
| 9,767,182 B1 | 9/2017 | Thakur et al. | |
| 9,773,256 B1 | 9/2017 | Frumkin et al. | |
| 9,898,554 B2 | 2/2018 | Gupta et al. | |
| 9,916,366 B1* | 3/2018 | Shukla | G06F 16/144 |
| 10,089,580 B2 | 10/2018 | Shan et al. | |
| 10,909,196 B1* | 2/2021 | Suzuki | G06F 16/9535 |
| 10,915,524 B1 | 2/2021 | Gupta et al. | |
| 11,126,921 B2* | 9/2021 | Conroy | G06N 20/10 |
| 2004/0249808 A1 | 12/2004 | Azzam et al. | |
| 2006/0136411 A1 | 6/2006 | Meyerzon et al. | |
| 2006/0149710 A1 | 7/2006 | Koningstein et al. | |
| 2006/0294071 A1* | 12/2006 | Weare | G06F 16/951 |
| 2007/0005587 A1 | 1/2007 | Johnson et al. | |
| 2007/0061333 A1 | 3/2007 | Ramer et al. | |
| 2007/0150466 A1 | 6/2007 | Brave et al. | |
| 2008/0109285 A1 | 5/2008 | Reuther et al. | |
| 2008/0114750 A1 | 5/2008 | Saxena et al. | |
| 2009/0063460 A1 | 3/2009 | Selberg | |
| 2009/0070299 A1* | 3/2009 | Parikh | G06F 16/334 |
| | | | 707/999.005 |
| 2009/0234711 A1 | 9/2009 | Ramer et al. | |
| 2009/0241066 A1* | 9/2009 | Costello | G06F 16/9535 |
| | | | 715/843 |
| 2009/0248661 A1* | 10/2009 | Bilenko | G06F 16/951 |
| | | | 707/999.005 |
| 2009/0254512 A1* | 10/2009 | Broder | G06Q 30/02 |
| 2009/0313286 A1 | 12/2009 | Mishra et al. | |
| 2010/0010895 A1 | 1/2010 | Gabrilovich et al. | |
| 2010/0082582 A1 | 4/2010 | Gao et al. | |
| 2010/0185649 A1 | 7/2010 | Zhou et al. | |
| 2010/0198816 A1 | 8/2010 | Kwan | |
| 2010/0312764 A1 | 12/2010 | Liao et al. | |
| 2010/0332493 A1 | 12/2010 | Haas et al. | |
| 2011/0004588 A1* | 1/2011 | Leitersdorf | G06F 16/951 |
| | | | 707/711 |
| 2011/0238662 A1 | 9/2011 | Shuster et al. | |
| 2011/0264651 A1 | 10/2011 | Selvaraj et al. | |
| 2012/0143790 A1 | 6/2012 | Wang et al. | |
| 2012/0158685 A1* | 6/2012 | White | G06F 16/9535 |
| | | | 707/723 |
| 2012/0203717 A1* | 8/2012 | Xu | G06N 20/00 |
| | | | 706/12 |
| 2012/0253792 A1 | 10/2012 | Bespalov et al. | |
| 2013/0024443 A1* | 1/2013 | Achuthan | G06F 16/3349 |
| | | | 707/E17.005 |
| 2013/0110824 A1 | 5/2013 | Derose et al. | |
| 2013/0246412 A1* | 9/2013 | Shokouhi | G06F 16/9535 |
| | | | 707/E17.084 |
| 2013/0282704 A1* | 10/2013 | Pantel | G06F 16/2425 |
| | | | 707/723 |
| 2015/0186938 A1* | 7/2015 | Zhang | G06Q 30/0256 |
| | | | 705/14.54 |
| 2015/0248454 A1 | 9/2015 | Muraoka et al. | |
| 2015/0262077 A1 | 9/2015 | White et al. | |
| 2015/0310527 A1* | 10/2015 | Warren | G06Q 30/0623 |
| | | | 705/26.62 |
| 2015/0347519 A1 | 12/2015 | Hornkvist et al. | |
| 2015/0356199 A1 | 12/2015 | Mei et al. | |
| 2015/0363688 A1 | 12/2015 | Gao et al. | |
| 2016/0042296 A1* | 2/2016 | Shan | G06F 16/9535 |
| | | | 706/11 |
| 2016/0085740 A1* | 3/2016 | Ikawa | G06F 40/205 |
| | | | 704/9 |
| 2016/0299899 A1 | 10/2016 | Logachev | |
| 2016/0321321 A1 | 11/2016 | Huang | |
| 2016/0321367 A1 | 11/2016 | Arya et al. | |
| 2017/0011289 A1 | 1/2017 | Gao et al. | |
| 2017/0060844 A1 | 3/2017 | He et al. | |
| 2017/0060993 A1 | 3/2017 | Pendar et al. | |
| 2017/0061294 A1* | 3/2017 | Weston | G06F 16/334 |
| 2017/0083523 A1* | 3/2017 | Philip | G06F 16/2246 |
| 2017/0124447 A1 | 5/2017 | Chang et al. | |
| 2017/0235819 A1 | 8/2017 | Liao et al. | |
| 2017/0249311 A1 | 8/2017 | Pelleg et al. | |
| 2017/0262449 A1* | 9/2017 | Venkataraman | G06F 16/24578 |
| 2017/0286835 A1 | 10/2017 | Ho et al. | |
| 2017/0300828 A1* | 10/2017 | Feng | G06N 20/00 |
| 2017/0344555 A1 | 11/2017 | Yan et al. | |
| 2018/0032897 A1 | 2/2018 | Cao et al. | |
| 2018/0052853 A1 | 2/2018 | Rickard et al. | |
| 2018/0121550 A1 | 5/2018 | Jeon et al. | |
| 2018/0150466 A1 | 5/2018 | Paquet et al. | |
| 2019/0034793 A1* | 1/2019 | Kataria | G06F 16/93 |
| 2019/0188295 A1* | 6/2019 | Sirotkovic | G06N 3/0454 |
| 2019/0205472 A1 | 7/2019 | Kulkarni | |
| 2019/0236132 A1* | 8/2019 | Zhu | G06N 20/20 |
| 2019/0258722 A1* | 8/2019 | Guo | G06F 16/9535 |
| 2019/0294692 A1* | 9/2019 | Zhao | G06F 16/951 |

(56) References Cited

U.S. PATENT DOCUMENTS

| | | | |
|---|---|---|---|
| 2019/0340256 A1 | | 11/2019 | Kulkarni |
| 2019/0370605 A1* | | 12/2019 | Xie .................. G06N 20/00 |
| 2020/0004886 A1* | | 1/2020 | Ramanath ............. G06N 20/20 |
| 2020/0082212 A1* | | 3/2020 | Alcock ................ G06F 16/784 |

FOREIGN PATENT DOCUMENTS

| | | |
|---|---|---|
| KR | 20100069118 A | 6/2010 |
| RU | 2556425 C1 | 7/2015 |
| RU | 2609079 C2 | 1/2017 |
| RU | 2632143 C1 | 10/2017 |
| RU | 2637998 C1 | 12/2017 |
| RU | 2643466 C1 | 2/2018 |

OTHER PUBLICATIONS

Search Report with regard the counterpart RU Patent Application No. 2018144177 completed May 21, 2020.
Office Action with regard to the counterpart U.S. Appl. No. 16/190,441 dated Jun. 11, 2020.
Search Report with regard to the RU counterpart patent application No. 2017146890 completed Dec. 13, 2019.
Search Report with regard to the RU counterpart patent application No. 2018122689 completed Jan. 28, 2020.
English Abstract for JP2008181186 retrieved on Espacenet on May 3, 2018.
English Abstract for KR20100069118 retrieved on Espacenet on May 3, 2018.
Huang et al., "Learning Deep Structured Semantic Models for Web Search using Clickthrough Data", CIKM'13, 2013, USA, 8 pages.
Wen et al., "Query Clustering Using User Logs", ACM Transactions on Information Systems, vol. 20, No. 1, 2002, pp. 59-81.
Wen et al., "Clustering User Queries of a Search Engine", WWW10, 2001, Hong Kong, 14 pages, http://wwwconference.org/www10/cdrom/papers/368/index.html.
Beeferman et al., "Agglomerative clustering of a search engine query log", Agglomerative clustering of a search engine query log, 2000, USA, 10 pages.
"DSSM", Microsoft Research, 2015, 4 pages, https://www.microsoft.com/en-us/research/project/dssm/.
English Abstract for CN 106095983 retrieved on Espacenet on May 9, 2018.
Office Action with regard the counterpart U.S. Appl. No. 16/571,870 dated Aug. 27, 2021.
McCreadie et al., "A Study of Personalised Medical Literature Search", In: Kanoulas E. et al. (eds) Information Access Evaluation. Multilinguality, Multimodality, and Interaction. CLEF 2014. Lecture Notes in Computer Science, vol. 8685. Springer, Cham, https://doi.org/10.1007/978-3-319-11382-1_8, Abstract, 7 pages.
Gao et al., "Clickthrough-Based Translation Models for Web Search: from Word Models to Phrase Models", CIKM'10, Oct. 26-29, 2010, Toronto, Ontario, Canada, 10 pages.
Gao et al., "Clickthrough-Based Latent Semantic Models for Web Search", SIGIR'11, Jul. 24-28, 2011, Beijing, P. R. China, 10 pages.
Office Action with regard to the U.S. Appl. No. 16/387,679 dated May 12, 2021.
Notice of Allowance with regard to the U.S. Appl. No. 16/387,679 dated Jul. 21, 2021.
Baeza-Yates, "Graphs from Search Engine Queries", International Conference on Current Trends in Theory and Practice of Computer Science, SOFSEM 2007: Theory and Practice of Computer Science, https://link.springer.com/chapter/10.1007/978-3-540-69507-3_1, Abstract, 4 pages.
Office Action with regard to the counterpart U.S. Appl. No. 16/190,441 dated Oct. 21, 2020.
Office Action with regard the counterpart U.S. Appl. No. 16/571,870 dated Jul. 13, 2021.
Eugene Opoku-Mensah et al., "Understanding User Situational Relevance in Ranking Web Search Results", IEEE, pp. 405-410, Nov. 23, 2017.
Yongjian Liu et al., "The Research Of Optimizing Page Ranking Based On User's Feature", IEEE, pp. 1950-1952, Oct. 4, 2012.

* cited by examiner

METHOD OF AND SYSTEM FOR GENERATING TRAINING SET FOR MACHINE LEARNING ALGORITHM (MLA)

CROSS-REFERENCE

The present application claims priority to Russian Patent Application No. 2018147501, filed Dec. 29, 2018, entitled "METHOD OF AND SYSTEM FOR GENERATING TRAINING SET FOR MACHINE LEARNING ALGORITHM (MLA)", the entirety of which is incorporated herein.

FIELD

The present technology relates to machine learning algorithms in general and, more specifically, to a method of and a system for generating a training set for a machine learning algorithm.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

In the search engine example, the MLA is used for generating the ranked search results. When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such the MLA is "trained" to predict relevancy of the given search result to the search query based on a plethora of "features" associated with the given search result, as well as indications of past users' interactions with search results when submitting similar search queries in the past.

In order to use the MLA to predict relevance of search results to a given user-submitted query, the MLA needs to be "trained". Depending on the implementation of the MLA, training can be implemented differently, such as supervised training, unsupervised training, etc. In a typical training approach, though, the MLA is presented with a number of training examples—labelled training sets that are used to "teach" the MLA to draw conclusions on the task at hand (such as predicting relevance of documents to the search query). Typically, the MLA is presented with "positive" examples (in this example, documents that are relevant) and "negative" examples (in this example, documents that are not relevant).

U.S. Pat. No. 8,655,868 issued to eBay Inc, on Feb. 18, 2014 discloses inferring relationships between queries. In an example, queries are related based on the identification of common terms between the queries. Another example is to relate queries based on the identification that the queries are associated with a single search session. Yet another example is to infer relationships based on the identification of relationships between item attributes retrieved from the submission of the queries.

U.S. Pat. No. 8,612,367 issued to Microsoft Corp on Dec. 17, 2013 discloses Techniques are described for determining queries that are similar to rare queries. An n-gram space is defined to represent queries and a similarity function is defined to measure the similarities between queries. The similarity function is learned by leveraging training data derived from user behavior data and formalized as an optimization problem using a metric learning approach. Furthermore, the similarity function can be defined in the n-gram space, which is equivalent to a cosine similarity in a transformed n-gram space. Locality sensitive hashing can be exploited for efficient retrieval of similar queries from a large query repository. This technique can be used to enhance the accuracy of query similarity calculation for rare queries, facilitate the retrieval of similar queries and significantly improve search relevance.

U.S. Pat. No. 9,720,904 issued to IBM Corp on Aug. 1, 2013 discloses a method for generating training data for disambiguation of an entity comprising a word or word string related to a topic to be analyzed includes acquiring sent messages by a user, each including at least one entity in a set of entities; organizing the messages and acquiring sets, each containing messages sent by each user; identifying a set of messages including different entities, greater than or equal to a first threshold value, and identifying a user corresponding to the identified set as a hot user; receiving an instruction indicating an object entity to be disambiguated; determining a likelihood of co-occurrence of each keyword and the object entity in sets of messages sent by hot users; and determining training data for the object entity on the basis of the likelihood of co-occurrence of each keyword and the object entity in the sets of messages sent by the hot users.

SUMMARY

Developers of the present technology have appreciated at least one technical problem associated with the prior art approaches.

The present technology relates to machine learning algorithms in general, and more specifically, to methods and systems for generating a training set for a machine learning algorithm. As has been alluded to above, when training various supervised learning based Machine Learning Algorithms (MLAs)—be it decision tree based MLA, or Neural Networks (NN)—the MLA is fed with "training sets". Training sets are marked examples illustrating both positive answers and negative answers. The positive examples teach the MLA what a particular target "is" and the negative examples teach the MLA what the particular target "is not".

Generally speaking, the positive examples are easy to generate. For example, for search queries and documents pairs, the examples can be "mined" using search query logs of a search engine server, with users clicks being a good indication of relevancy of the given past document to the given past user query. The negative examples may be more difficult to generate.

A typical MLA training system uses "random" negative examples with a "hope" that the most random examples will be radically different form the positive examples and, thus, will serve well as negative examples. However, in reality, the "effectiveness" of negative examples is not 100% (closer to the 80% mark).

In accordance with the non-limiting embodiments of the present technology, instead of generating negative examples randomly, the present technology is directed to generation of negative training examples using a query proximity method. In accordance with some non-limiting embodiments of the present technology, the query proximity technology is used for determining a similarity score between queries in a pair by analyzing similar search results provided in response to the queries of the pair and, optionally, user interactions with the search results.

Some of the non-limiting embodiments of the present technology use the query proximity technology to identify queries in a pair that (i) have a high textual overlap but are different therebetween with a pre-determined difference parameter; and (ii) have a low search result overlap.

Broadly speaking, the low result overlap can manifest itself in, with regard to the two SERPs respectively associated with the two past queries: (i) no documents in the two SERP overlapping, (ii) no clicked documents in the two SERP overlapping, (iii) a pre-determined maximum number of documents overlapping in the two SERPs, or (vi) a pre-determined number of maximum number of clicked documents overlapping in the two SERPs.

The high textual overlap can manifest itself with regard to the past two queries, as an example, by a similarity of the terms of the two past queries. In other words, two queries may be considered to have a high textual overlap if the queries differ by only by one term (but yet have different meanings, as illustrated by the example below).

Consider an example of two past search queries submitted by past users to a search engine:
Query 1—[restaurant on Queen Street]
Query 2—[Queen Street gas-station]

The two past search queries differ by a single term (i.e. restaurant vs. gas-station). If the SERPs that were previously provided in response to these two queries are different or the user interactions with the past SERPs is indicative of the non-overlapping documents being relevant to the two past search queries (i.e. there is no overlap between the search results in the SERPs, or there is no click overlap between similar search results in the SERPs), these queries may be determined to be "super different" queries, and may be used as negative training examples.

Generally speaking, in accordance to the non-limiting embodiments of the present technology a "proximity" or similarity between past search queries can be determined by using a query vector, i.e. a vector including information about documents that were present in the SERPs and/or have received user interactions in a SERP that was provided to past users in response to a query submitted on the search engine.

For example, each respective query of the pair is associated with a respective set of documents (Di) that has been presented as a respective SERP in response to the respective query:
Query 1=[D1, _____, _____, D4, _____, _____, D7]
Query 2=[D1, _____, D3, D4, _____, _____, D7]

Here, the queries would be considered as being proximate or "close" queries due to the overlap of documents D1, D4, and D7.

As another example:
Query 1=[D1, _____, _____, D4, _____, _____, D7]
Query 2=[_____, _____, D3, _____, _____, D6, _____]

Here, the two past queries would be considered as queries having no-overlapping click history and, for that matter, no overlapping documents (i.e. which the present technology aims at identifying).

In accordance with the non-limiting embodiments of the present technology, document vectors for the search query can be calculated using documents present in the associated SERP, documents present in the associated SERP and clicked by the past users, or some combination of the two approaches (i.e. pure document overlap, or clicked document overlap, etc.).

In yet further alternative non-limiting embodiments of the present technology, two queries can be considered to be proximate or "close" in case they have a pre-determined number of overlapping search results. In these non-limiting alternative embodiments of the present technology, the low result overlap is determined by the number of overlapping result being low (i.e. under a pre-determined threshold) or being on low positions (i.e. ranked below a pre determined threshold).

For example, let's consider two examples.
Pair 1
Query 3=[D10, _____, _____, D15, _____, _____, D17]
Query 4=[D10, _____, _____, D13, D14, _____, _____, D18]
Pair 2
Query 5=[D21, _____, D23, D24, _____, _____, D27]
Query 6=[D22, _____, D23, D24, _____, _____, D27]

In the above example, both Pair 1 and Pair 2 can be considered to be close queries, in case the pre-determined number of overlapping search results is at least one. As in the case of Pair 1, one search result is overlapping; while in case of Pair 2, three search results are overlapping.

Now, in this example, let it be assumed that the low result overlap is determined by a maximum two overlapping search results (irrespective of the rank of the overlapping search results). Under this scenario, the Pair 1 would be considered to have low overlap, as there is only a single overlapping search result between the two search queries of the Pair 1.

Now, on the other hand, the search queries of the Pair 2 would be considered to not have low result overlap, as they have three search results overlapping.

On the other hand, if in another example, let it be assume that the low result overlap is determined by any number of overlapping search results, as long as they are not on high position. Let it be assume that "high position", as an example only, is rank number one and rank number two. Under this scenario, the Pair 1 would not be considered to have low overlap, as there the overlapping search results are indeed ranked number one.

Now, on the other hand, the search queries of the Pair 2 would be considered to have low result overlap, as they have three search results overlapping, but none of them are placed at high ranked search results (they are ranked number three, four, and seven).

In some of these alternative non-limiting embodiments of the present technology, only a pre-determined number of top results of the pair of SERPs is considered, such as top ten results or the like.

In some alternative non-limiting embodiments of the present technology, at least one common search result of a plurality of search results would be considered to have low result overlap for the pair of SERPs.

In some non-limiting embodiments of the present technology, the top ten results are further compares using the following formula:

POSITION_COMMON_URL(query1)*POSITION_COMMON_URL(query2)>const

Where POSITION_COMMON_URL(query) is an average position associated with the overlapping search result. The const is a constant value, which can be empirically selected. As an example, the const can have a value of 50.

The above formula (when true) denotes such search results that are not very relevant for either of the search queries in the pair.

In other words, embodiments of the present take advantage of the developers' appreciation that search engine operators, such as Google™, Yandex™, Bing™ and Yahoo™, among others, have access to a large amount of user interaction data with respect to search results appearing in response to user queries, which may be used to generate query proximity parameters for past queries in order to select specific pairs of past search queries that can be used for negative training examples for training or re-training the MLA that is to be used for determining relevance of a document to a search query, when trained and in use.

Thus, embodiments of the present technology are directed to a method and a system for generating training sets for training the MLA and, in particular, to generating negative examples for the training sets. Some non-limiting embodiments of the present technology are further directed to categorization of negative examples into easy and difficult ones and selecting the specific ones of the easy/difficult negative examples based on the training aim at hand (i.e. a specific target function to be learnt by the MLA, as an example).

According to a first broad aspect of the present technology, there is provided a computer-implemented method for generating a set of training objects for training a machine learning algorithm (MLA) to determine query similarity based on textual content thereof, the MLA executable by a server. The method is executable by the server and comprises: retrieving, from a search log database of the server, a first query having been submitted on the server, the first query being associated with a first set of search results, each respective search result being associated with a respective user interaction parameter; retrieving, from the search log database, based on terms of the first query, a set of queries, each respective query of the set having been previously submitted on the server, each respective query differing from the first query by a pre-determined number of respective terms; retrieving, from the search log database, for each respective query of the set of queries, a respective set of search results, each respective search result of the respective set being associated with a respective user interaction parameter, each respective set of search results including a respective portion of search results differing from search results in the first set of search results; computing, by the server, a respective similarity score between the first query and a given query of the set of queries based on: the first set of search results and the respective set of search results, and the associated user interaction parameters in the first set of search results and the respective set of search results; determining, by the server, a subset of queries from the set of queries based on the respective similarity score being below a predetermined similarity threshold; and generating the set of training objects to be used as negative training examples for training the MLA, each training object including the first query, a respective query of the subset of queries, and the respective similarity score between the first query and the respective query.

In some implementations of the method, the pre-determined number of differing terms is a single term.

In some implementations of the method, the respective portion of search results differing from search results in the first set of search results comprises an entirety of search results between the first query and each of the subset of queries being non-overlapping.

In some implementations of the method, the respective portion of search results differing from search results in the first set of search results comprises a subset of search results between the first query and each of the subset of queries with non-overlapping user interactions parameters.

In some implementations of the method, the non-overlapping user interactions parameters are indicative of past users choosing different search results in the first set of search results and search results in the respective set of search results.

In some implementations of the method, the respective portion of search results differing from search results in the first set of search results comprises a pre-determine number of search results being non-overlapping.

In some implementations of the method, the training objects being the negative training example is configured to train the MLA to focus on a difference in search results attributable to the single term being different between the first query and the respective query.

In some implementations of the method, the computing the respective similarity score between the first query and a given query of the set of queries comprises: generating a first query vector for the first query; generating a second query vector for the given query of the and each respective query of the set; and wherein; calculating the similarity score based on a cosine multiplication of the first query and the second query.

In some implementations of the method, the generating the first query comprises generating the first query vector based on: the first set of search results, and the associated user interaction parameters in the first set of search results.

In some implementations of the method, the generating the second query comprises generating the second query vector based on: the respective set of search results associated with the given query, and the associated user interaction parameters the respective set of search results.

In some implementations of the method, the predetermined similarity threshold is based on a value of the cosine multiplication being indicative of similarity between the first query vector and the second query vector.

In some implementations of the method, a second trained MLA is configured to generate the first vector and the second vector.

In some implementations of the method, the respective user interaction parameter comprises at least one of: a number of clicks, a click-through rate (CTR), a dwell time, a click depth, a bounce rate, and an average time spent on the document.

In some implementations of the method, the method further comprises categorizing each of the subset of queries from the set of queries: based on the respective similarity score being below the predetermined similarity threshold as a difficult negative example, and based on the respective similarity score being above the predetermined similarity threshold as being an easy negative example.

In some implementations of the method, the method further comprises selecting one of the easy negative example and the difficult negative example, the selecting being based on a target function that the MLA needs to learn.

In accordance with another broad aspect of the present technology, there is provided a computer-implemented method for generating a set of training objects for training a machine learning algorithm (MLA) to determine query similarity based on textual content thereof, the MLA executable by a server, the method executable by a server. The method comprises: retrieving, from a search log database of the server, a first query having been submitted on the server, the first query being associated with a first set of search results, each respective search result being associated with a respective user interaction parameter; retrieving, from the search log database, based on terms of the first query, a set of queries, each respective query of the set having been previously submitted on the server, each respective query differing from the first query by a pre-determined number of respective terms; retrieving, from the search log database, for each respective query of the set of queries, a respective set of search results, each respective search result of the respective set being associated with a respective user interaction parameter, each respective set of search results including a respective portion of search results differing from search results in the first set of search results; determining, by the server, a subset of queries from the set of queries such that for a given pair in the subset of queries, the given pair including the first query and one of the respective set of search results: a query difference in queries in minimized; a results difference in respective search results is maximized; generating the set of training objects to be used as negative training examples for training the MLA, each training object including the first query, a respective query of the subset of queries, and an indication of dissimilarity of respective search results.

In some implementations of the method, the query difference is minimized when the queries are different only by a pre-determined low number of query terms; and the results difference is maximized when the search results are different by a pre-determined larger number of search results.

In some implementations of the method, the first query and one of the respective set of search results are further selected such that the results difference in respective search results is further maximized based on user interactions with associated overlapping search results.

In some implementations of the method, the query difference is determined based on a number of overlapping search results being above a first pre-determined threshold; the results difference is determined based on the number of overlapping search results being below a second pre-determined threshold.

In accordance with yet another broad aspect of the present technology, there is provided a system for generating a plurality of annotation vectors for a document, the plurality of annotation vectors to be used as features by a first machine-learning algorithm (MLA) for information retrieval, the system executable by a second MLA on the system. The system comprises: a processor; a non-transitory computer-readable medium comprising instructions, the processor, upon executing the instructions, being configured to: retrieve, from a search log database of the server, a first query having been submitted on the server, the first query being associated with a first set of search results, each respective search result being associated with a respective user interaction parameter; retrieve, from the search log database, based on terms of the first query, a set of queries, each respective query of the set having been previously submitted on the server, each respective query differing from the first query by a pre-determined number of respective terms; retrieve, from the search log database, for each respective query of the set of queries, a respective set of search results, each respective search result of the respective set being associated with a respective user interaction parameter, each respective set of search results including a respective portion of search results differing from search results in the first set of search results; compute, by the server, a respective similarity score between the first query and a given query of the set of queries based on: the first set of search results and the respective set of search results, and the associated user interaction parameters in the first set of search results and the respective set of search results; determine, by the server, a subset of queries from the set of queries based on the respective similarity score being below a predetermined similarity threshold; and generate the set of training objects to be used as negative training examples for training the MLA, each training object including the first query, a respective query of the subset of queries, and the respective similarity score between the first query and the respective query.

In accordance with yet another broad aspect of the present technology, there is provided a computer-implemented method for generating a set of training objects for training a machine learning algorithm (MLA) to determine query similarity based on textual content thereof, the MLA executable by a server, the method executable by the server. The method comprises: retrieving, from a search log database of the server, a first query having been submitted on the server, the first query being associated with a first set of search results, each respective search result being associated with a respective user interaction parameter; retrieving, from the search log database, based on terms of the first query, a set of queries, each respective query of the set having been previously submitted on the server, each respective query having a number of overlapping search results with the first query being above a pre-determined first threshold; retrieving, from the search log database, for each respective query of the set of queries, a respective set of search results, each respective search result of the respective set being associated with a respective user interaction parameter, each respective set of search results including having the number overlapping search results being below a pre-determined second threshold; determining, by the server, a subset of queries from the set of queries such that for a given pair in the subset of queries, the given pair including the first query and one of the respective set of search results: a query difference in queries in minimized; a results difference in respective search results is maximized; generating the set of training objects to be used as negative training examples for training the MLA, each training object including the first query, a respective query of the subset of queries, and an indication of dissimilarity of respective search results.

In some implementations of the method, the pre-determined second threshold is expressed as a number.

In some implementations of the method, the pre-determined second threshold is expressed as a position in the respective set of search results.

In some implementations of the method, the pre-determined first threshold is lower than the pre-determined second threshold.

In some implementations of the method, the number overlapping search results is considered only for an N-top results of the respective set of search results.

In some implementations of the method, the N-top results is 10-top results.

In some implementations of the method, the results difference in respective search results to be used as negative training examples for training the MLA, may be done by virtue of combining low results overlap and zero results overlap.

In some implementations of the method, the query difference in queries in minimized by virtue of the pre-determined first threshold being at least one; the results difference in respective search results is maximized by virtue of the pre-determined second threshold being one of: (i) a substantially low number; (ii) a position that is low in the respective search results.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
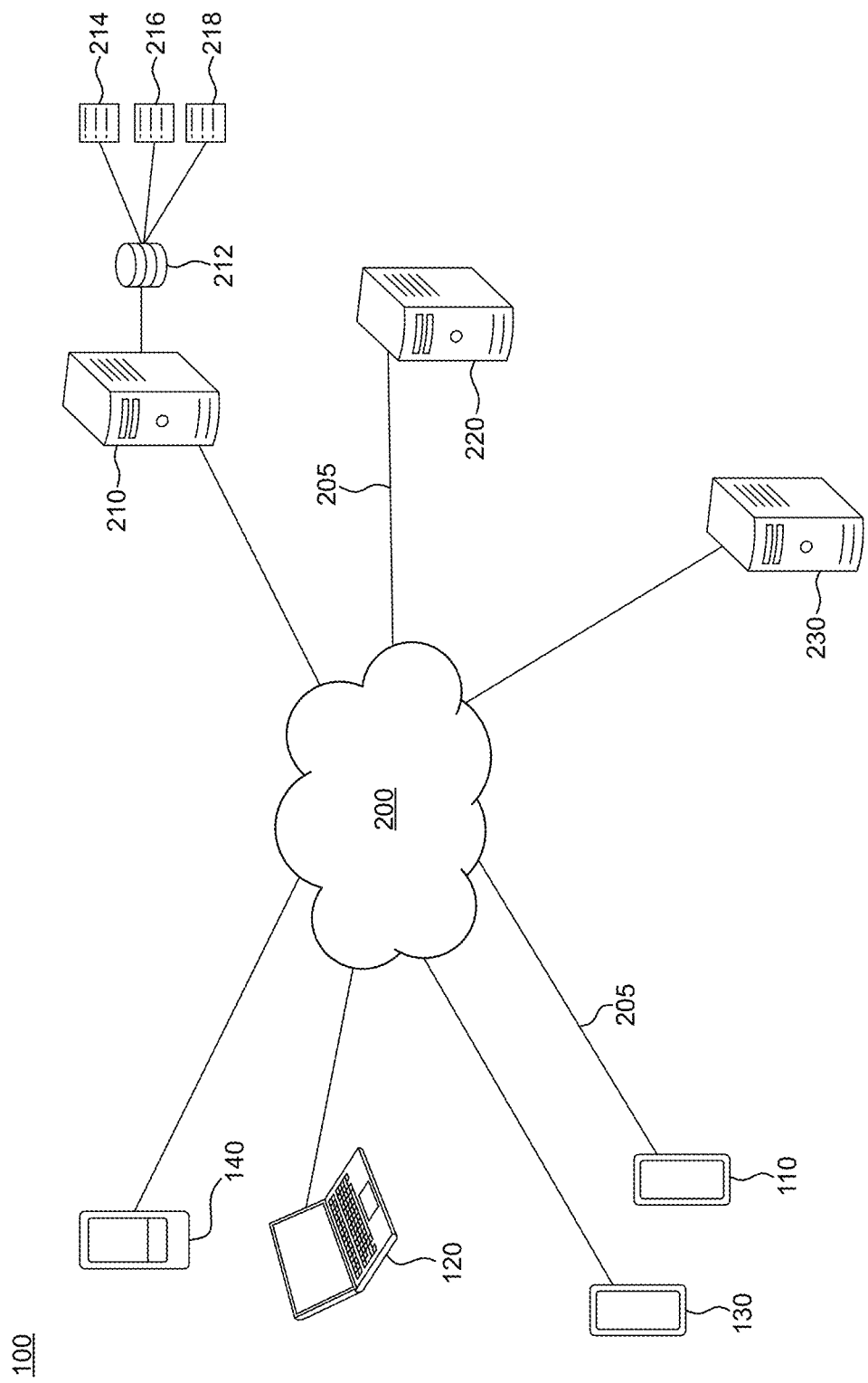
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is depicted a system 100, the system 100 implemented according to non-limiting embodiments of the present technology. The system 100 comprises a first client device 110, a second client device 120, a third client device 130, and a fourth client device 140 coupled to a communications network 200 via a respective communication link 205. The system 100 comprises a search engine server 210, an analytics server 220 and a training server 230 coupled to the communications network 200 via their respective communication link 205.

As an example only, the first client device 110 may be implemented as a smartphone, the second client device 120 may be implemented as a laptop, the third client device 130 may be implemented as a smartphone and the fourth client device 140 may be implemented as a tablet. In some non-limiting embodiments of the present technology, the communications network 200 can be implemented as the Internet. In other embodiments of the present technology, the communications network 200 can be implemented differently, such as any wide-area communications network, local-area communications network, a private communications network and the like.

How the communication link 205 is implemented is not particularly limited and will depend on how the first client device 110, the second client device 120, the third client device 130 and the fourth client device 140 are implemented. Merely as an example and not as a limitation, in those embodiments of the present technology where at least one of the first client device 110, the second client device 120, the third client device 130 and the fourth client device 140 is implemented as a wireless communication device (such as a smart-phone), the communication link 205 can be implemented as a wireless communication link (such as but not limited to, a 3G communications network link, a 4G communications network link, a Wireless Fidelity, or WiFi® for short, Bluetooth® and the like). In those examples, where at least one of the first client device 110, the second client device 120, the third client device 130 and the fourth client device 140 are implemented respectively as laptop, smartphone, tablet computer, the communication link 205 can be either wireless (such as the Wireless Fidelity, or WiFi® for short, Bluetooth® or the like) or wired (such as an Ethernet based connection).

It should be expressly understood that implementations for the first client device 110, the second client device 120, the third client device 130, the fourth client device 140, the communication link 205 and the communications network 200 are provided for illustration purposes only. As such, those skilled in the art will easily appreciate other specific implementational details for the first client device 110, the second client device 120, the third client device 130, the fourth client device 140 and the communication link 205 and the communications network 200. As such, by no means, examples provided herein above are meant to limit the scope of the present technology.

While only four client devices 110, 120, 130 and 140 are illustrated, it is contemplated that any number of client devices 110, 120, 130 and 140 could be connected to the system 100. It is further contemplated that in some implementations, the number of client devices 110, 120, 130 and 140 included in the system 100 could number in the tens or hundreds of thousands.

Also coupled to the communications network 200 is the aforementioned search engine server 210. The search engine server 210 can be implemented as a conventional computer server. In an example of an embodiment of the present technology, the search engine server 210 can be implemented as a Dell™ PowerEdge™ Server running the Microsoft™ Windows Server™ operating system. Needless to say, the search engine server 210 can be implemented in any other suitable hardware and/or software and/or firmware or a combination thereof. In the depicted non-limiting embodiment of present technology, search engine server 210 is a single server. In alternative non-limiting embodiments of the present technology, the functionality of the search engine server 210 may be distributed and may be implemented via multiple servers. In some embodiments of the present technology, the search engine server 210 is under control and/or management of a search engine operator. Alternatively, the search engine server 210 can be under control and/or management of a service provider.

Generally speaking, the purpose of the search engine server 210 is to (i) execute searches; (ii) execute analysis of search results and perform ranking of search results; (iii) group results and compile the search result page (SERP) to be outputted to an electronic device (such as one of the first client device 110, the second client device 120, the third client device 130 and the fourth client device 140).

How the search engine server 210 is configured to execute searches is not particularly limited. Those skilled in the art will appreciate several ways and means to execute the search using the search engine server 210 and as such, several structural components of the search engine server 210 will only be described at a high level. The search engine server 210 may maintain a search log database 212.

In some embodiments of the present technology, the search engine server 210 can execute several searches, including but not limited to, a general search and a vertical search.

The search engine server 210 is configured to perform general web searches, as is known to those of skill in the art. The search engine server 210 is also configured to execute one or more vertical searches, such as an images vertical search, a music vertical search, a video vertical search, a news vertical search, a maps vertical search and the like. The search engine server 210 is also configured to, as is known to those of skill in the art, execute a crawler algorithm—which algorithm causes the search engine server 210 to "crawl" the Internet and index visited web sites into one or more of the index databases, such as the search log database 212.

The search engine server 210 is configured to generate a ranked search results list, including the results from the general web search and the vertical web search. Multiple algorithms for ranking the search results are known and can be implemented by the search engine server 210.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 210 can thus calculate and assign a relevance score (based on the different criteria listed above) to each search result obtained in response to a user-submitted search query and generate a SERP, where search results are ranked according to their respective relevance scores. In the present embodiment, the search engine server 210 may execute a plurality of machine learning algorithms for ranking documents and/or generate features for ranking documents.

The search engine server typically maintains the above-mentioned search log database 212.

Generally, the search log database 212 may maintain an index 214, a query log 216, and a user interaction log 218.

The purpose of the index 214 is to index documents, such as, but not limited to, web pages, images, PDFs, Word™ documents, PowerPoint™ documents, that have been crawled (or discovered) by the crawler of the search engine server 210. As such, when a user of one of the first client device 110, the second client device 120, the third client device 130, and the fourth client device 140 inputs a query and performs a search on the search engine server 210, the search engine server 210 analyzes the index 214 and retrieves documents that contain terms of the query, and ranks them according to a ranking algorithm.

The purpose of the query log 216 is to log searches that were made using the search engine server 210. The purpose of the query log 216 is to log searches that were made using the search engine server 210. More specifically, the query log 216 maintains terms of search queries (i.e. the associated search words) and the associated search results. It is noted that the query log 216 can be maintained in an anonymized manner—i.e. search queries are not trackable to the users who have submitted the search query.

More specifically, the query log 216 may include a list of queries with their respective terms, with information about documents that were listed by the search engine server 210 in response to a respective query, a timestamp, and may also contain a list of users identified by anonymous IDs (or without an ID altogether) and the respective documents they have clicked on after submitting a query. In some embodiments, the query log 216 may be updated every time a new search is performed on the search engine server 210. In other embodiments, the query log 216 may be updated at predetermined times. In some embodiments, there may be a plurality of copies of the query log 216, each corresponding to the query log 216 at different points in time.

The user interaction log 218 may be linked to the query log 216, and list user interaction parameters as tracked by the analytics server 220 after a user has submitted a query and clicked on one or more documents in a SERP on the search engine server 210. As a non-limiting example, the user interaction log 218 may contain reference to a document, which may be identified by an ID number or an URL, a list of queries, where each query of the list of queries is associated with a plurality of user interaction parameters, which will be described in more detail in the following paragraphs. The plurality of user interaction parameters may generally be tracked and compiled by the analytics server 220, and in some embodiments may be listed for each individual user.

Non-limiting examples of user interactions tracked by the user interaction log 218 include (but are not limited to):
  Loss/Win: was the document clicked in response to the search query or not.
  Dwell time: time a user spends on a document before returning to the SERP.
  Long/short click: was the user interaction with the document long or short, compared to the user interaction with other documents on the SERP.

Naturally, the above list is non-exhaustive and may include other types of user interactions without departing from the scope of the present technology. In some embodiments, the analytics server 220 may compile user interaction data (which may, as a non-limiting example, include user interactions for every hour) and generate user interactions to be stored in the user interaction log 218 in a suitable format for implementing the present technology (which, may as a non-limiting example, be user interactions for a predetermined period of time of 3 months). In other embodiments, the user interaction log 218 may store the user interaction data in a raw form, such that it can retrieved and compiled by at least one of the search engine server 210, the analytics server 220, the training server 230, or another server (not depicted) in a suitable format for implementing the present technology.

In some embodiments, the query log 216 and the user interaction log 218 may be implemented as a single log.

Also coupled to the communications network 200 is the above-mentioned analytics server 220. The analytics server 220 can be implemented as a conventional computer server. In an example of an embodiment of the present technology, the analytics server 220 can be implemented as a Dell™ PowerEdge™ Server running the Microsoft™ Windows Server™ operating system. Needless to say, the analytics server 220 can be implemented in any other suitable hardware and/or software and/or firmware or a combination thereof. In the depicted non-limiting embodiment of present technology, the analytics server 220 is a single server. In alternative non-limiting embodiments of the present technology, the functionality of the analytics server 220 may be distributed and may be implemented via multiple servers. In other embodiments, the functionality of the analytics server 220 may be performed completely or in part by the search engine server 210. In some embodiments of the present technology, the analytics server 220 is under control and/or management of a search engine operator. Alternatively, the analytics server 220 can be under control and/or management of another service provider.

Generally speaking, the purpose of the analytics server 220 is to analyze user interactions with search results provided by the search engine server 210 in response to user requests (e.g. made by users of one of the first client device 110, the second client device 120, the third client device 130 and the fourth client device 140) based on data stored in the user interaction log 218.

Non-limiting examples of user interaction parameters generated by the analytics server 220 include (but are not limited to):
  Click-through rate (CTR): Number of clicks on an element divided by the number of times the element is shown (impressions).
  Session Time: Mean session time, measured in seconds.
  Log Session Time: Mean logarithmic value of session times.
  Queries: The number of queries submitted by a user.
  Clicks: The number of clicks performed by a user.
  Clicks per Query: The average number of clicks per query for the user.
  Click-through rate (CTR): Number of clicks on an element divided by the number of times the element is shown (impressions).
  Daily Active Users (DAU): Number of unique users engaging with the service during a day.
  Average daily sessions per user (S/U): u S(u) |u|, where S(u) indicates user u's daily session number and |u| is the total number of users on that day.
  Average unique queries per session (UQ/S): s UQ(s) |s|, where UQ(s) represents the number of unique queries within session s, and |s| the total number of sessions on that day.
  Average session length per user (SL/U): the total number of queries within a session, averaged over each user.
  Percentage of navigational queries per user (%-Nav-Q/U): click positions: if over n % of all clicks for a query is concentrated on top-3 ranked URLs, this query is considered to be navigational. Otherwise it is treated as informational. The value of n may be set to 80.
  Average query length per user (QL/U): the query length measures the number of words in a user query.
  Average query success rate per user (QSuccess/U): a user query is said to be successful if the user clicks one or more results and stays at any of them for more than 30 seconds.
  Average query interval per user (QI/U): the average time difference between two consecutive user queries within a user session.
  Dwell time: time a user spends on a document before returning to the SERP.

Naturally, the above list is non-exhaustive and may include other types of user interaction parameters without departing from the scope of the present technology.

The analytics server 220 may transmit the tracked user interaction parameters to the search engine server 210 such that it can be stored in the user interaction log 218. In some embodiments, the analytics server 220 may store the user interaction parameters and associated search results locally in a user interaction log (not depicted). In alternative non-limiting embodiments of the present technology, the functionality of the analytics server 220 and the search engine server 210 can be implemented by a single server.

Also coupled to the communications network 200 is the above-mentioned training server 230. The training server 230 can be implemented as a conventional computer server. In an example of an embodiment of the present technology, the training server 230 can be implemented as a Dell™ PowerEdge™ Server running the Microsoft™ Windows Server™ operating system. Needless to say, the training server 230 can be implemented in any other suitable hardware and/or software and/or firmware or a combination thereof. In the depicted non-limiting embodiment of present technology, the training server 230 is a single server. In alternative non-limiting embodiments of the present technology, the functionality of the training server 230 may be distributed and may be implemented via multiple servers. In the context of the present technology, the training server 230 may implement in part the methods and system described herein. In some embodiments of the present technology, the training server 230 is under control and/or management of a search engine operator. Alternatively, the training server 230 can be under control and/or management of another service provider.

Generally speaking, the purpose of the training server 230 is to train one or more machine learning algorithms (MLAs). In one example, the MLA so trained can be used by the search engine server 210. In other non-limiting embodiments of the present technology, the MLA so trained can be used by the analytics server 220 and/or other servers (not depicted) associated with the search engine operator.

The training server 230 may, as an example, train one or more MLAs associated with the search engine server 210 for optimizing general web searches, vertical web searches, providing recommendations, predicting outcomes, and other applications. The training and optimization of the MLAs may be executed at predetermined periods of time, or when deemed necessary by the search engine provider.

In the embodiments illustrated herein, the training server 230 may be configured to train (1) a first MLA for ranking documents on the search engine server 210, and (2) a second MLA for generating features that may be used by the first MLA, and (3) a third MLA for generating training sets for training the firs MLA.

The first MLA, the second MLA and the third MLA will be described in more detail in the following paragraphs. While the description refers to general web searches for documents such as web pages, the present technology may also be applied at least partially to vertical searches and to other types of documents, such as image results, videos, music, news, and other types of searches.

Figure 2:
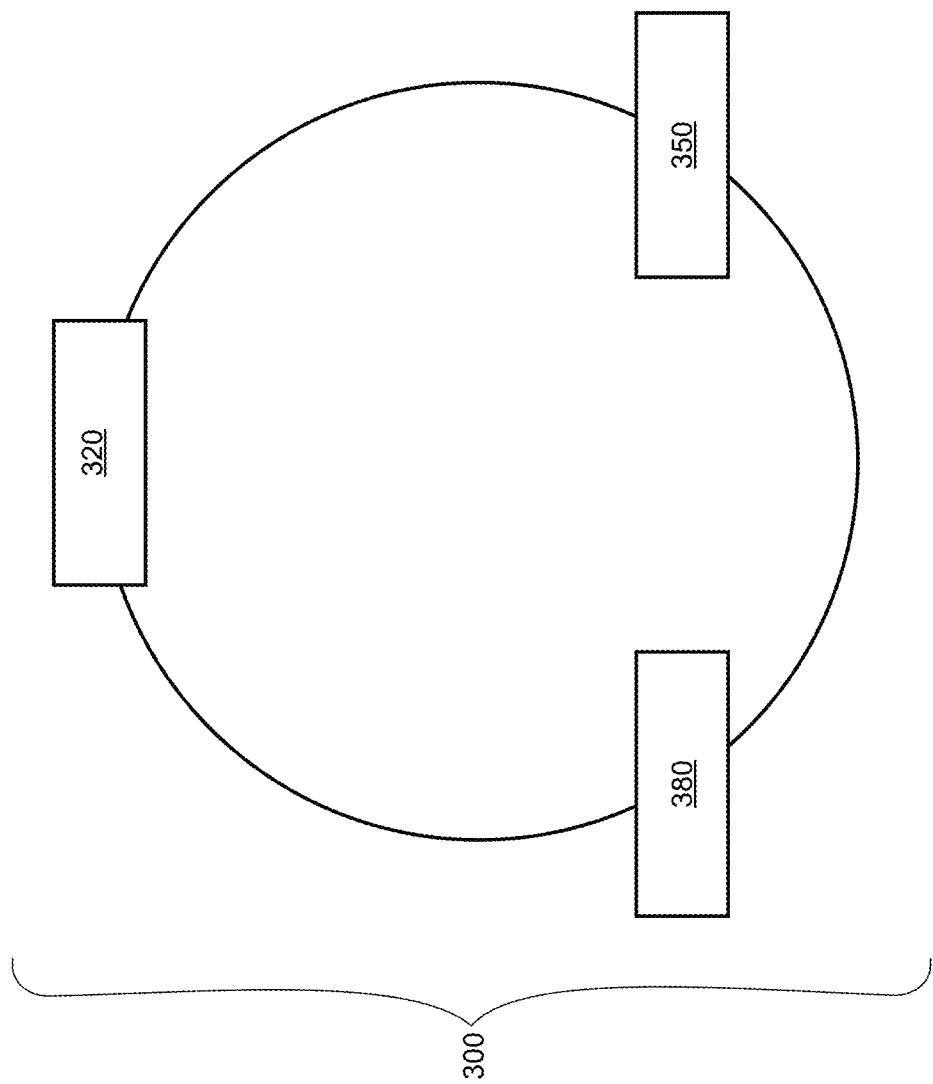
FIG. 2 depicts a schematic representation of machine learning system implemented in accordance with embodiments of the present technology.

Now turning to FIG. 2, a machine learning system 300 is illustrated in accordance with non-limiting embodiments of the present technology. The machine learning system 300 comprises a first MLA 320, a second MLA 350 and a third MLA 380.

The first MLA 320 may generally be used for ranking search results on the search engine server and may implement a gradient boosted decision tree algorithm (GBRT). Briefly speaking, GBRT is based on decision trees, whereby a prediction model in the form of an ensemble of trees is generated. The ensemble of trees is built in a stage-wise manner Each subsequent decision tree in the ensemble of decision trees focuses training on those previous decision tree iterations that were "weak learners" in the previous iteration(s) of the decision trees ensemble (i.e. those that are associated with poor prediction/high error). Boosting is a method aimed at enhancing prediction quality of an MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the first MLA 320 first builds a first tree, then a second tree, which enhances the prediction outcome of the first tree, then a third tree, which enhances the prediction outcome of the first two trees and so on. Thus, the first MLA 320 in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

The first MLA 320 may thus be used for classification and/or regression and/or ranking by the search engine server 210. The first MLA 320 may be the main ranking algorithm of the search engine server 210, or may be part of the ranking algorithm of the search engine server 210.

Generally, the purpose of the second MLA 350 is to generate document and/or query features such that the features may be used by the first MLA 320 for ranking documents based on a relevance score or by the third MLA 380 to generate the training sets of training objects for training or retraining of the first MLA 320. Broadly speaking, the features generated by the second MLA 350 can be used for matching queries and documents, for comparing queries and documents, for making predictions of user interaction with a given document, comparing two queries and determining their likeness, and the like.

Generally, the purpose of the third MLA 380 is to generate training sets of training objects for use in training the first MLA 320 (and/or the second MLA 350). The third MLA 380 can generate the training set of training objects based, at least in part, based on the document and/or query features generated by the second MLA 350 and/or the second MLA 350, as will be explained in greater detail herein below.

In some alternative non-limiting embodiments of the present technology, some or all of the first MLA 320, the second MLA 350 and the third MLA 380 may be implemented as a single MLA (not depicted) executed by one or more servers. In yet further non-limiting embodiments of the present technology, one or more of the first MLA 320, the second MLA 350 and the third MLA 380 may in itself be implemented in a distributed manner.

Figure 3:
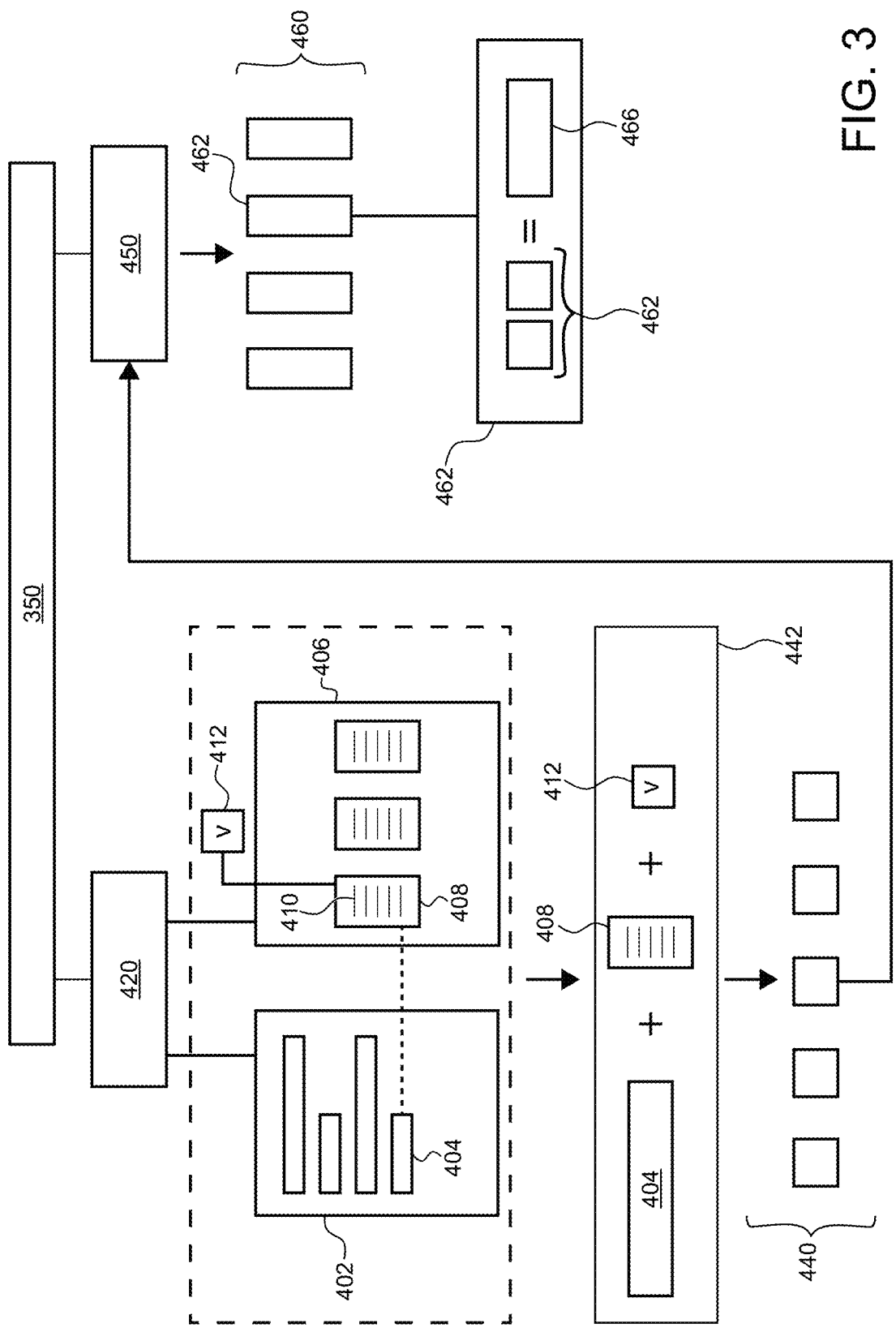
FIG. 3 depicts a schematic representation of a third MLA implemented in accordance with embodiments of the present technology.

Now turning to FIG. 3, the second MLA 350 is illustrated in accordance with non-limiting embodiments of the present technology. The second MLA 350 may be executed by the training server 230.

The second MLA 350 comprises a query vector generator 420 and a similarity parameter generator 450. The query vector generator 420 of the second MLA 350 may generally be configured to retrieve, aggregate, filter and associate together queries, documents and user interaction parameters of past queries associated with past searches.

Query Vector Generator

The query vector generator 420 may generally be configured to retrieve search queries, search results having been presented in response to the search queries, as well as user interactions associated with each of the search results, to generate a respective vector for each query, where the respective vector includes information about the respective search results, as well as the respective user interactions associated with the search results. In some embodiments, the query vector generator 420 may generate a respective vector for each query based only on search results.

The query vector generator 420 may retrieve, from the query log 216 of search log database 212, an indication of a plurality of search queries 402. Generally, speaking, each search query 404 in the indication of the plurality of search queries 402 is a search query that has been previously submitted on the search engine server 210. In some embodiments, each search query 404 in the indication of the plurality of search queries 402 may be a reference to the search query, a numerical representation of the search query, or a text of the search query. The indication of the plurality of search queries 402 may include a predetermined number of search queries. The number of search queries 404 in the indication of the plurality of search queries 402 is not limited. As a non-limiting example, the indication of the plurality of the search queries 402 may include the 10,000,000 most popular search queries that have been previously submitted by users (such as user of the first client device 110, the second client device 120, the third client device 130 and the fourth client device 140) on the search engine server 210.

In some embodiments, each search query 404 in the indication of the plurality of search queries 402 may be chosen based on specific criteria, such as, but not limited to: popularity of the query on the search engine server 210, linguistic features of the search query 404, and respective search results associated with the search query 404, and the like. In alternative embodiments, each search query 404 in the indication of the plurality of search queries 402 may be chosen randomly.

The query vector generator 420 may retrieve, from the query log 216 and/or the user interaction log 228, an indication of a plurality of search results 406. The indication of the plurality of search results 406 includes, for each search query 404 of the indication of the plurality of search queries 402, a respective set of search results 408 that was provided in response to the search query 404.

Each respective search result 410 of the respective set of search results 408 may be associated with one or more respective user interactions 412. Generally, each of the one or more user interactions 412 may be indicative of user behaviour of one or more users after having submitted the search query 404 on the search engine server 210, where the one or more users may have clicked, or otherwise interacted with one or more search results in the respective set of search results 408 during a search session on the search engine server 210, as an example via one of the first client device 110, the second client device 120, the third client device 130, and the fourth client device 140. In some embodiments, the query vector generator 420 may retrieve one or more specific user interactions that are relevant to the task at hand, and may not necessarily retrieve all user interactions tracked by and stored in the user interaction log 228 of the search log database 212.

Generally, the one or more respective user interactions 412 may be an aggregate of user interactions from a plurality of users (e.g. total number of times a given search result 410 has been clicked on), and may not be individual user interactions (i.e. user-specific interactions).

The query vector generator 420 may then, for each respective search query 404 associated with a respective set of search results 408, compute a respective query vector 442.

In some non-limiting embodiments of the present technology, the respective query vector 442 includes, for the respective search query 404, information from each of the respective set of search results 408, including the respective search result 410 and the associated user interaction 412. In alternative non-limiting embodiments of the present technology, the respective query vector 442 includes, for the respective search query 404, information from each of the respective set of search results 408, including the respective search result 410 (but without the associated user interaction 412). In other words, the respective query vector 442 includes, for the respective search query 404, information from each of the respective set of search results 408, including the respective search result 410 and, optionally, the associated user interaction 412.

The manner in which each respective query vector 442 is represented is not limited, and generally the purpose of the respective query vector 442 is to include information about search results and, optionally, user interactions tracked in response to a query in a vector such that it can be compared with another respective vector, and that a similarity between two queries may be assessed by using the query vectors as a "proxy" by comparing similar search queries, similar search results and respective user interactions.

In some non-limiting embodiments of the present technology, each row or column of the respective query vector 442 can be associated with the respective search query 404 may correspond to a respective search result 410 of the respective set of search results 408, and each element may correspond to a presence of a respective user interaction 412, e.g. an element may be equal to 1 if there is a user interaction or if the user interaction is above a predetermined threshold, and 0 if there is no user interaction, or if the user interaction is below the predetermined threshold. In other embodiments, an element of a vector may have a value of the respective user interaction 412 associated with the respective search result 410. The respective query vector 442 may also be represented in binary form.

In some embodiments, when more than one type of user interaction is considered for a respective search result 410, each respective query vector 442 may be represented as a matrix or, or there may be more than one respective query vector 442 per respective search query 404 (each corresponding to a different type of user interaction).

In alternative non-limiting embodiments of the present technology, each row or column of the respective query vector 442 can be associated with the respective search query 404 may correspond to a respective search result 410 of the respective set of search results 408. In other words, the respective query vector 442 may be representative of either (i) the associated respective search result 410 or (ii) the associated respective search result 410 with an indication of the presence of the respective user interaction 412.

The query vector generator 420 may then output a plurality of query vectors 440, each query vector 442 being associated with a respective search query 404 of the indication of the plurality of search queries 402.

In some embodiments, the plurality of query vectors 440 may be stored in a training database (not depicted) of the training server 230 for a later use.

Similarity Parameter Generator

The similarity parameter generator 450 may receive as an input the plurality of query vectors 440, and output a set of similarity parameters 460, each similarity parameter 462 in the set of set of similarity parameters 460 including a pair of queries 464, and a respective similarity value 466, the respective similarity value 466 being indicative of a similarity level between the two queries in the pair of queries 464. The set of similarity parameters 460 is what considered as a similarity score between two search queries.

Generally, the purpose of the similarity parameter generator 450 is to compute, for each possible respective pair of queries 464 within the indication of the plurality of search queries 402, the respective similarity value 466. The respective similarity value 466 is indicative of a similarity level between the queries included in the pair of queries 464, based on at least one of: (i) similar search results obtained in response to the queries of the pair of queries 464; and (ii) user interactions with the respective similar search results. The similarity level may be assessed by comparing the query vectors associated with each of the queries in the pair of queries.

As a non-limiting example, in the present embodiment, the respective similarity value 466 for the pair of queries 464 may be obtained by performing a scalar multiplication of their respective associated query vectors 442 in the set of query vectors 440. As such, the respective similarity value 466 may be directly indicative of the similarity between the queries via their search results and user interactions.

As a non-limiting example, the respective similarity value 466 having a value of 10 may indicate that the two search queries in the pair of queries 464 have at least 10 similar search results, and that the 10 similar results have a presence of user interactions, such as the CTR (where as a non-limiting example, for a given search result in the query vector, the presence of CTR above a predetermined threshold of 0.6 has a value of 1, and the presence of CTR below the predetermined threshold of 0.6 has a value of 0).

In some embodiments, the respective similarity parameter may be relative, e.g. if there are 10 similar search results that have a CTR on a total of 20 search results, the respective similarity value 466 may be 10/20=0.5 or 50%. In some embodiments, the respective similarity value 466 may be weighted based on different criteria. In alternative embodiments, where the query vector 442 includes the values of each user interactions, the respective similarity value 466 may be a result of a scalar multiplication of those values. As a non-limiting example, for a pair of queries 464 having 3 similar search results, with a first query vector of the pair of queries 464 having CTR values of (0.2 0.5 0.7) for the 3 search results, and a second query vector of the pair of queries 464 having CTR values of (0.65 0.2 0.4) for the 3 search results, the respective similarity value 466 may be computed by performing: 0.2*(0.65)+0.5*(0.2)+0.7*(0.4) =0.51 (e.g. the results that are not similar may be ignored).

In embodiments where more than one type of user interaction is associated with each search result, there may be more than one respective similarity value 466 for each pair of queries (each corresponding to a different type of user interaction), or the respective similarity value 466 may be a sum of the respective similarity parameters.

In alternative embodiments, other methods known in the art may be used to quantify a similarity between queries based on similar search results and user interactions, such as, but not limited to, cosine similarity, bipartite graphs, and Pearson correlation coefficient.

The set of similarity parameters 460 may be stored in the training database of the training server 230. It is noted that in alternative non-limiting embodiments of the present technology, the set of similarity parameters 460 can be generated "on the fly" when the set of similarity parameters 460 is needed for comparison of queries, as will be explained in greater detail herein below.

Given the architecture described herein above, it is possible to execute a method for generating a set of training objects for training a machine learning algorithm (MLA) to determine query similarity based on textual content thereof. More specifically, the non-limiting embodiments of the method can be implemented by the training server 230 in order to generate training sets for training the first MLA 250 to be used by the search engine server 210 to rank search results and/or the second MLA 350 for generating features to be used by the first MLA 250.

Broad Method Description

More specifically, the non-limiting embodiments of the present technology are directed to generation of negative training examples using a query proximity method. In accordance with some non-limiting embodiments of the present technology, the query proximity technology is used for determining a similarity score between queries in a pair by analyzing similar search results provided in response to the queries of the pair.

In some alternative non-limiting embodiments of the present technology, the query proximity technology is used for determining a similarity score between queries in a pair by analyzing similar search results provided in response to the queries of the pair and user interactions with the similar search results. The non-limiting embodiments of the present technology use the query proximity technology to identify queries in a pair that (i) have a high textual overlap but are different therebetween with a pre-determined difference parameter; and (ii) have a low search result overlap.

In at least some non-limiting embodiments of the present technology, the closeness of the queries in a pair is determined based on a high textual overlap (for example, two search queries having only a single word/term that is different). In these non-limiting embodiments of the present technology, the difference between the two queries is determined based on the low search result overlap (such as no result overlap or a pre-determined, substantially low, result overlap).

In some alternative non-limiting embodiments of the present technology, closeness of the queries in a pair is determined based on an overlap in the search results (whether interacted with or not). For example, two search queries can be considered to be close if they have at least one overlapping search result (whether clicked or not).

In these non-limiting embodiments of the present technology, the difference between the two queries is determined based on the number of the overlapped search results being low. In accordance with the non-limiting embodiments of the present technology, the "low" number of overlapped search results can mean at least one: (i) a substantially low, pre-determined number of overlapped result (such as one, two, three, etc.) or (ii) the overlapped search results being on lower positions of the SERP (such as a second page, a tenth page, an N-th page and below, etc).

Thus, to sum up and broadly speaking, the low result overlap can manifest itself in, with regard to the two SERPs respectively associated with the two past queries: (i) no documents in the two SERP overlapping, (ii) no clicked documents in the two SERP overlapping, (iii) a pre-determined maximum number of documents overlapping in the two SERPs, or (vi) a pre-determined number of maximum number of clicked documents overlapping in the two SERPs.

The high textual overlap can manifest itself with regard to the past two queries, as an example, by a similarity of the terms of the two past queries. In other words, two queries may be considered to have a high textual overlap if the queries differ by only by one term (but yet have different meanings, as illustrated by the example below).

Consider an example of two past search queries submitted by past users to a search engine:

Query 1—[restaurant on Queen Street]
Query 2—[Queen Street gas-station]

The two past search queries differ by a single term (i.e. restaurant vs. gas-station). If the SERPs that were previously provided in response to these two queries are different or the user interactions with the past SERPs is indicative of the non-overlapping documents being relevant to the two past search queries (i.e. there is no overlap between the search results in the SERPs, or there is no click overlap between similar search results in the SERPs), these queries may be determined to be "super different" queries, and may be used as negative training examples.

Generally speaking, in accordance to the non-limiting embodiments of the present technology a "proximity" or similarity between past search queries can be determined by using a query vector, i.e. a vector including information about documents that were present in the SERPs and/or have received user interactions in a SERP that was provided to past users in response to a query submitted on the search engine.

For example, each respective query of the pair is associated with a respective set of documents (Di) that has been presented as a respective SERP in response to the respective query:

Query 1=[D1, _____, _____, D4, _____, _____, D7]
Query 2=[D1, _____, D3, D4, _____, _____, D7]

Here, the queries would be considered as being proximate or "close" queries due to the overlap of documents D1, D4, and D7.

As another example:

Query 1=[D1, _____, _____, D4, _____, _____, D7]
Query 2=[_____, _____, D3, _____, _____, D6, _____]

Here, the two past queries would be considered as queries having no-overlapping click history and, for that matter, no overlapping documents (i.e. which the present technology aims at identifying).

In accordance with the non-limiting embodiments of the present technology, document vectors for the search query can be calculated using documents present in the associated SERP, documents present in the associated SERP and clicked by the past users, or some combination of the two approaches (i.e. pure document overlap, or clicked document overlap, etc.).

In yet further alternative non-limiting embodiments of the present technology, two queries can be considered to be proximate or "close" in case they have a pre-determined number of overlapping search results. For example, let's consider two examples.

Pair 1

Query 3=[D10, _____, _____, D15, _____, _____, D17]

Query 4=[D10, _____, D13, D14, _____, _____, D18]

Pair 2

Query 5=[D21, _____, D23, D24, _____, _____, D27]

Query 6=[D22, _____, D23, D24, _____, _____, D27]

In the above example, both Pair 1 and Pair 2 can be considered to be close queries, in case the pre-determined number of overlapping search results is at least one. As in the case of Pair 1, one search result is overlapping; while in case of Pair 2, three search results are overlapping.

Now, in this example, let it be assumed that the low result overlap is determined by a maximum two overlapping search results (irrespective of the rank of the overlapping search results). Under this scenario, the Pair 1 would be considered to have low overlap, as there is only a single overlapping search result between the two search queries of the Pair 1.

On the other hand, the search queries of the Pair 2 would be considered to not have low result overlap, as they have three search results overlapping.

On the other hand, if in another example, let it be assumed that the low result overlap is determined by any number of overlapping search results, as long as they are not on high position. Let it be assumed that "high position", as an example only, is rank number one and rank number two. Under this scenario, the Pair 1 would not be considered to have low overlap, as there the overlapping search results are indeed ranked number one.

Now, on the other hand, the search queries of the Pair 2 would be considered to have low result overlap, as they have three search results overlapping, but none of them are placed at high ranked search results (they are ranked number three, four, and seven).

In other words, embodiments of the present take advantage of the developers' appreciation that search engine operators, such as Google™, Yandex™, Bing™ and Yahoo™, among others, have access to a large amount of user interaction data with respect to search results appearing in response to user queries, which may be used to generate query proximity parameters for past queries in order to select specific pairs of past search queries that can be used for negative training examples for training or re-training the MLA that is to be used for determining relevance of a document to a search query, when trained and in use.

Thus, embodiments of the present technology are directed to a method and a system for generating training sets for training the MLA and, in particular, to generating negative examples for the training sets. Some non-limiting embodiments of the present technology are further directed to categorization of negative examples into easy and difficult ones and selecting the specific ones of the easy/difficult negative examples based on the training aim at hand (i.e. a specific target function to be learnt by the MLA, as an example).

Method (First Non-Limiting Embodiment)

Figure 4:
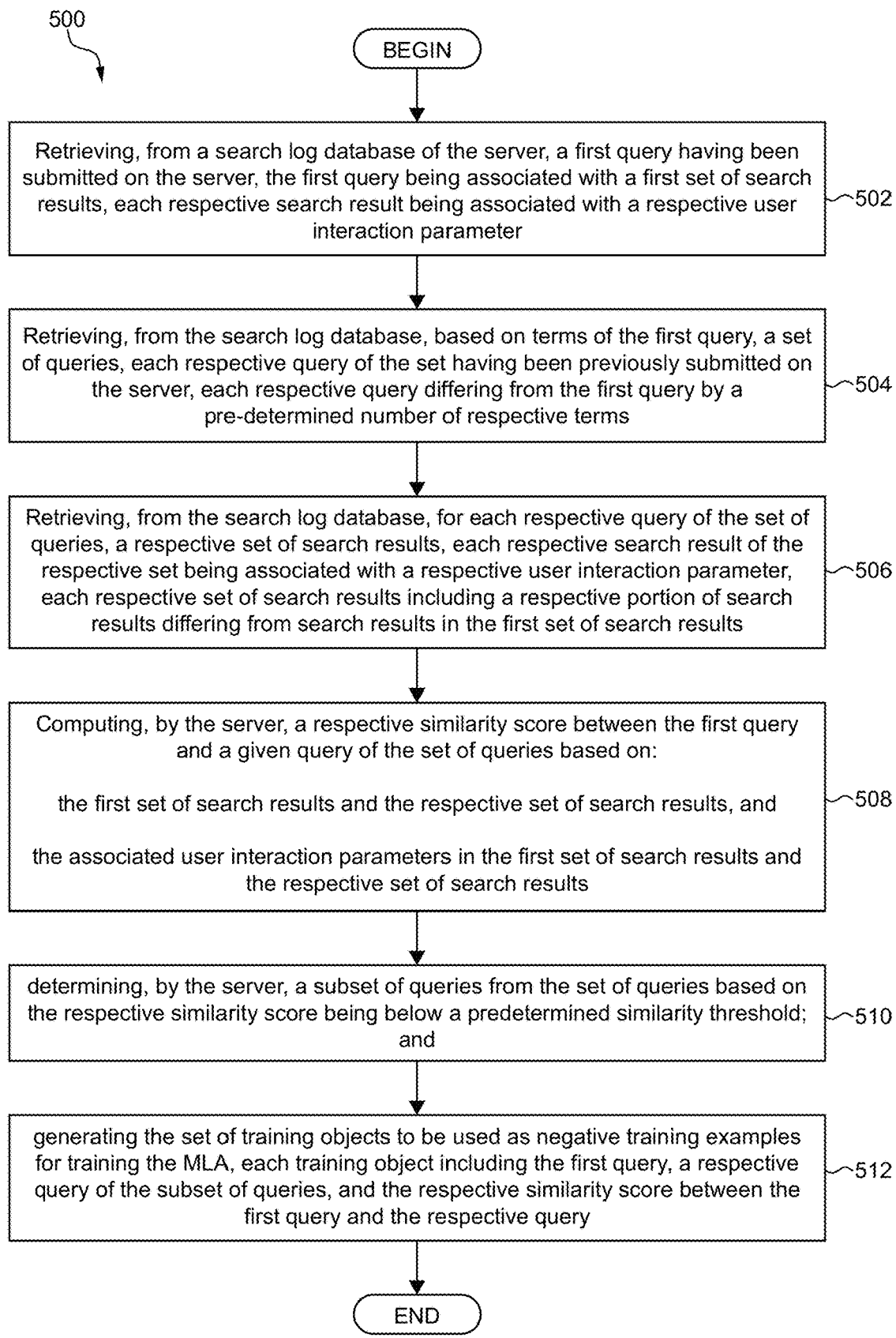
FIG. 4 depicts a block diagram of a method for generating a training set of training objects for training an MLA, the method executable within the system of FIG. 1 in accordance to some non-limiting embodiments of the present technology.

With reference to FIG. 4, there is depicted a flow chart of a method 500, the method 500 being implementable in accordance with non-limiting embodiments of the present technology.

Step 502—Retrieving, from a Search Log Database of the Server, a First Query Having Been Submitted on the Server, the First Query Being Associated with a First Set of Search Results, Each Respective Search Result Being Associated with a Respective User Interaction Parameter The method 500 begins at step 502, the training server 230 retrieves, from a search log database 212, a first query having been submitted on the search engine server 210, the first query being associated with a first set of server results, each respective search result being associated with a respective user interaction parameter.

As has been alluded to above, the respective user interaction parameter is indicative of a given user either interacting with the given search result (clicking the search result, for example, or not). As has also been alluded to above, the indication of the respective user interaction parameter can be tracked by the analytics server 220 and stored in the user interaction log 218.

Step 504—Retrieving, from the Search Log Database, Based on Terms of the First Query, a Set of Queries, Each Respective Query of the Set Having Been Previously Submitted on the Server, Each Respective Query Differing from the First Query by a Pre-Determined Number of Respective Terms At step 504, the training server 230 retrieves, from the search log database 212, based on terms of the first query, a set of queries, each respective query of the set having been previously submitted on the server, each respective query differing from the first query by a pre-determined number of respective terms.

The identification, by the training server 230, of the set of queries, each respective query of the set having been previously submitted on the server, each respective query differing from the first query by a pre-determined number of respective terms can be executed based on a set of heuristics and a linguistic analysis of the search queries. As an example, the training server 230 can compare any combination of pairs of search queries (in a word by word manner) to determine how many words are different in a given pair of two search queries.

Step 506—Retrieving, from the Search Log Database, for Each Respective Query of the Set of Queries, a Respective Set of Search Results, Each Respective Search Result of the Respective Set Being Associated with a Respective User Interaction Parameter, Each Respective Set of Search Results Including a Respective Portion of Search Results Differing from Search Results in the First Set of Search Results At step 506, the training server 230 retrieves, from the search log database 212, for each respective query of the set of queries, a respective set of search results, each respective search result of the respective set being associated with a respective user interaction parameter, each respective set of search results including a respective portion of search results differing from search results in the first set of search results.

Step 508—Computing, by the Server, a Respective Similarity Score Between the First Query and a Given Query of the Set of Queries Based on: the First Set of Search Results and the Respective Set of Search Results, and the Associated User Interaction Parameters in the First Set of Search Results and the Respective Set of Search Results At step 508, the training server 230 computes, a respective similarity score between the first query and a given query of the set of queries based on: the first set of search results and the respective set of search results, and the associated user interaction parameters in the first set of search results and the respective set of search results.

Step 508 can be executed by using the query vector generator 420 and the similarity parameter generator 450.

Step 510—Determining, by the Server, a Subset of Queries from the Set of Queries Based on the Respective Similarity Score Being Below a Predetermined Similarity Threshold At step 510, the training server 230 determines a subset of queries from the set of queries based on the respective similarity score being below a predetermined similarity threshold.

Step 512—Generating the Set of Training Objects to be Used as Negative Training Examples for Training the MLA, Each Training Object Including the First Query, a Respective Query of the Subset of Queries, and the Respective Similarity Score Between the First Query and the Respective Query St step 512, the training server 230 generates a set of training objects to be used as negative training examples for training the MLA, each training object including the first query, a respective query of the subset of queries, and the respective similarity score between the first query and the respective query.

In accordance with the non-limiting embodiments of the present technology, the so-generated set of training objects can be used as negative examples for training the first MLA 320, as an example. In some non-limiting embodiments of the present technology, as part of the method 500, the training server 230 can further execute categorization of negative examples into easy and difficult ones and selecting the specific ones of the easy/difficult negative examples based on the training aim at hand (i.e. a specific target function to be learnt by the MLA, as an example).

Method (Second Non-Limiting Embodiment)

Figure 5:
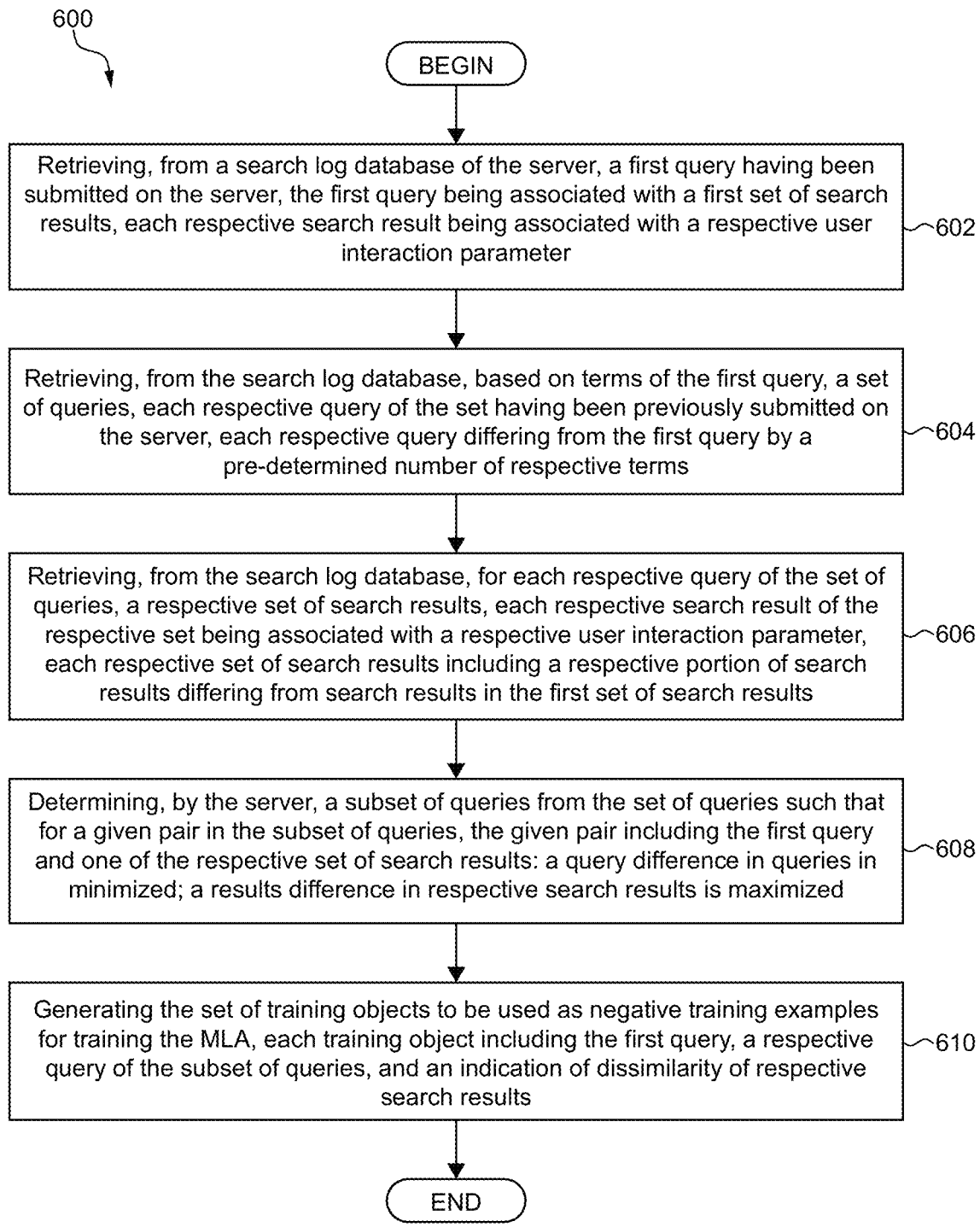
FIG. 5 depicts a block diagram of a method for generating a training set of training objects for training an MLA, the method executable within the system of FIG. 1 in accordance to some other non-limiting embodiments of the present technology.

With reference to FIG. 5, there is depicted a flow chart of a method 600, the method 600 being implementable in accordance with other non-limiting embodiments of the present technology.

Step 602—Retrieving, from a Search Log Database of the Server, a First Query Having Been Submitted on the Server, the First Query Being Associated with a First Set of Search Results, Each Respective Search Result Being Associated with a Respective User Interaction Parameter The method 600 begins at step 602, the training server 230 retrieves, from a search log database 212, a first query having been submitted on the search engine server 210, the first query being associated with a first set of server results, each respective search result being associated with a respective user interaction parameter.

As has been alluded to above, the respective user interaction parameter is indicative of a given user either interacting with the given search result (clicking the search result, for example, or not). As has also been alluded to above, the indication of the respective user interaction parameter can be tracked by the analytics server 220 and stored in the user interaction log 218.

Step 604—Retrieving, from the Search Log Database, Based on Terms of the First Query, a Set of Queries, Each Respective Query of the Set Having Been Previously Submitted on the Server, Each Respective Query Differing from the First Query by a Pre-Determined Number of Respective Terms At step 604, the training server 230 retrieves, from the search log database 212, based on terms of the first query, a set of queries, each respective query of the set having been previously submitted on the server, each respective query differing from the first query by a pre-determined number of respective terms.

The identification, by the training server 230, of the set of queries, each respective query of the set having been previously submitted on the server, each respective query differing from the first query by a pre-determined number of respective terms can be executed based on a set of heuristics and a linguistic analysis of the search queries. As an example, the training server 230 can compare any combination of pairs of search queries (in a word by word manner) to determine how many words are different in a given pair of two search queries.

Step 606—Retrieving, from the Search Log Database, for Each Respective Query of the Set of Queries, a Respective Set of Search Results, Each Respective Search Result of the Respective Set Being Associated with a Respective User Interaction Parameter, Each Respective Set of Search Results Including a Respective Portion of Search Results Differing from Search Results in the First Set of Search Results At step 606, the training server 230 retrieves, from the search log database 212, for each respective query of the set of queries, a respective set of search results, each respective search result of the respective set being associated with a respective user interaction parameter, each respective set of search results including a respective portion of search results differing from search results in the first set of search results.

Step 608—Determining, by the Server, a Subset of Queries from the Set of Queries Such that for a Given Pair in the Subset of Queries, the Given Pair Including the First Query and One of the Respective Set of Search Results: a Query Difference in Queries in Minimized; a Results Difference in Respective Search Results is Maximized At step 608, the training server 230 determines, a subset of queries from the set of queries such that for a given pair in the subset of queries, the given pair including the first query and one of the respective set of search results: a query difference in queries in minimized; a results difference in respective search results is maximized Step 608 can be executed by using the query vector generator 420 and the similarity parameter generator 450.

Step 610—Generating the Set of Training Objects to be Used as Negative Training Examples for Training the MLA, Each Training Object Including the First Query, a Respective Query of the Subset of Queries, and an Indication of Dissimilarity of Respective Search Results At step 610, the training server 230 generates the set of training objects to be used as negative training examples for training the MLA, each training object including the first query, a respective query of the subset of queries, and an indication of dissimilarity of respective search results.

Method (Third Non-Limiting Embodiment)

In yet additional non-limiting embodiments of the present technology, as an alternative in the method 500 or the method 600, instead of determining "super hard" examples of pairs of queries based on a number of words differing between the two search queries, the associated method steps can be implemented as follows.

In yet further alternative non-limiting embodiments of the present technology, two queries can be considered to be proximate or "close" in case they have a pre-determined number of overlapping search results. In these non-limiting alternative embodiments of the present technology, the low result overlap is determined by the number of overlapping result being low (i.e. under a pre-determined threshold) or being on low positions (i.e. ranked below a pre determined threshold).

For example, let's consider two examples.
Pair 1
Query 3=[D10, _____, _____, D15, _____, _____, D17]
Query 4=[D10, _____, D13, D14, _____, _____, D18]
Pair 2
Query 5=[D21, _____, D23, D24, _____, _____, D27]
Query 6=[D22, _____, D23, D24, _____, _____, D27]

In the above example, both Pair 1 and Pair 2 can be considered to be close queries, in case the pre-determined number of overlapping search results is at least one. As in the case of Pair 1, one search result is overlapping; while in case of Pair 2, three search results are overlapping.

Now, in this example, let it be assumed that the low result overlap is determined by a maximum two overlapping search results (irrespective of the rank of the overlapping search results). Under this scenario, the Pair 1 would be considered to have low overlap, as there is only a single overlapping search result between the two search queries of the Pair 1.

Now, on the other hand, the search queries of the Pair 2 would be considered to not have low result overlap, as they have three search results overlapping.

On the other hand, if in another example, let it be assume that the low result overlap is determined by any number of overlapping search results, as long as they are not on high position. Let it be assume that "high position", as an example only, is rank number one and rank number two.

Under this scenario, the Pair 1 would not be considered to have low overlap, as there the overlapping search results are indeed ranked number one.

Now, on the other hand, the search queries of the Pair 2 would be considered to have low result overlap, as they have three search results overlapping, but none of them are placed at high ranked search results (they are ranked number three, four, and seven).

In some of these alternative non-limiting embodiments of the present technology, only a pre-determined number of top results of the pair of SERPs is considered, such as top ten results or the like.

In some non-limiting embodiments of the present technology, the top ten results are further compares using the following formula:

POSITION_COMMON_URL(query1)*POSITION_COMMON_URL(query2)>const

Where POSITION_COMMON_URL(query) is an average position associated with the overlapping search result. The const is a constant value, which can be empirically selected. As an example, the const can have a value of 50.

The above formula (when true) denotes such search results that are not very relevant for either of the search queries in the pair.

The present technology may allow for more efficient generating of negative examples for training the MLA.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for generating a set of training objects for training a machine learning algorithm (MLA) to determine query similarity based on textual content thereof, the MLA executable by a server, the method executable by the server, the method comprising:
retrieving, from a search log database of the server, a first query having been submitted on the server,
the first query being associated with a first set of search results,
each respective search result being associated with a respective user interaction parameter;
retrieving, from the search log database, based on terms of the first query, a set of queries, each respective query of the set having been previously submitted on the server, each respective query differing from the first query by a pre-determined number of respective terms;
retrieving, from the search log database, for each respective query of the set of queries, a respective set of search results,
each respective search result of the respective set being associated with a respective user interaction parameter, each respective set of search results including a respective portion of search results differing from search results in the first set of search results;
computing, by the server, a respective similarity score between the first query and a given query of the set of queries based on:
the first set of search results,
the respective set of search results,
the user interaction parameters associated with the first set of search results, and
the user interaction parameters associated with the respective set of search results;
determining, by the server, a subset of queries from the set of queries based on the respective similarity score being below a predetermined similarity threshold; and
generating the set of training objects to be used as negative training examples for training the MLA, each training object including the first query, a respective query of the subset of queries, and the respective similarity score between the first query and the respective query.

2. The method of claim 1, wherein the pre-determined number of differing terms is a single term.

3. The method of claim 2, wherein the respective portion of search results differing from search results in the first set of search results comprises an entirety of search results between the first query and each of the subset of queries being non-overlapping.

4. The method of claim 2, wherein the respective portion of search results differing from search results in the first set of search results comprises a subset of search results between the first query and each of the subset of queries with non-overlapping user interactions parameters.

5. The method of claim 4, wherein the non-overlapping user interactions parameters are indicative of past users choosing different search results in the first set of search results and search results in the respective set of search results.

6. The method of claim 2, wherein the respective portion of search results differing from search results in the first set of search results comprises a pre-determine number of search results being non-overlapping.

7. The method of claim 3, wherein the training objects being the negative training example is configured to train the MLA to focus on a difference in search results attributable to the single term being different between the first query and the respective query.

8. The method of claim 1, wherein the computing the respective similarity score between the first query and a given query of the set of queries comprises:
generating a first query vector for the first query;
generating a second query vector for the given query of the set and each respective query of the set; and
wherein;
calculating the similarity score based on a cosine multiplication of the first query and the second query.

9. The method of claim 8, wherein generating the first query comprises generating the first query vector based on:
the first set of search results, and
the associated user interaction parameters in the first set of search results.

10. The method of claim 8, wherein generating the second query comprises generating the second query vector based on:
the respective set of search results associated with the given query, and
the associated user interaction parameters the respective set of search results.

11. The method of claim 8, wherein the predetermined similarity threshold is based on a value of the cosine multiplication being indicative of similarity between the first query vector and the second query vector.

12. The method of claim 8, wherein a second trained MLA is configured to generate the first vector and the second vector.

13. The method of claim 1, wherein the respective user interaction parameter comprises at least one of: a number of clicks, a click-through rate (CTR), a dwell time, a click depth, a bounce rate, and an average time spent on the document.

14. The method of claim 1, wherein the method further comprises categorizing each of the subset of queries from the set of queries:
based on the respective similarity score being below the predetermined similarity threshold as a difficult negative example, and
based on the respective similarity score being above the predetermined similarity threshold as being an easy negative example.

15. The method of claim 1, the method further comprises selecting one of the easy negative example and the difficult negative example, the selecting being based on a target function that the MLA needs to learn.

16. A computer-implemented method for generating a set of training objects for training a machine learning algorithm (MLA) to determine query similarity based on textual content thereof, the MLA executable by a server, the method executable by the server, the method comprising:
retrieving, from a search log database of the server, a first query having been submitted on the server,
the first query being associated with a first set of search results,
each respective search result being associated with a respective user interaction parameter;
retrieving, from the search log database, based on terms of the first query, a set of queries, each respective query of the set having been previously submitted on the server, each respective query differing from the first query by a pre-determined number of respective terms;
retrieving, from the search log database, for each respective query of the set of queries, a respective set of search results,
each respective search result of the respective set being associated with a respective user interaction parameter, each respective set of search results including a respective portion of search results differing from search results in the first set of search results;
determining, by the server, a subset of queries from the set of queries such that for a given pair in the subset of queries, the given pair including the first query and one of the respective set of search results:
a query difference in queries is minimized, and
a results difference in respective search results is maximized; and
generating the set of training objects to be used as negative training examples for training the MLA, each training object including the first query, a respective query of the subset of queries, and an indication of dissimilarity of respective search results.

17. The method of claim 16, wherein:
the query difference is minimized when the queries are different only by a pre-determined low number of query terms; and
the results difference is maximized when the search results are different by a pre-determined larger number of search results.

18. The method of claim 17, wherein the first query and one of the respective set of search results are further selected such that the results difference in respective search results is further maximized based on user interactions with associated overlapping search results.

19. The method of claim 16 wherein:
the query difference is determined based on a number of overlapping search results being above a first pre-determined threshold;
the results difference is determined based on the number of overlapping search results being below a second pre-determined threshold.

20. A computer-implemented method for generating a set of training objects for training a machine learning algorithm (MLA) to determine query similarity based on textual content thereof, the MLA executable by a server, the method executable by the server, the method comprising:
retrieving, from a search log database of the server, a first query having been submitted on the server,
the first query being associated with a first set of search results,
each respective search result being associated with a respective user interaction parameter;
retrieving, from the search log database, based on terms of the first query, a set of queries, each respective query of the set having been previously submitted on the server, each respective query having a number of overlapping search results with the first query being above a pre-determined first threshold;
retrieving, from the search log database, for each respective query of the set of queries, a respective set of search results,
each respective search result of the respective set being associated with a respective user interaction parameter, each respective set of search results including having the number overlapping search results being below a pre-determined second threshold;
determining, by the server, a subset of queries from the set of queries such that for a given pair in the subset of queries, the given pair including the first query and one of the respective set of search results:
a query difference in queries is minimized, and
a results difference in respective search results is maximized; and
generating the set of training objects to be used as negative training examples for training the MLA, each training object including the first query, a respective query of the subset of queries, and an indication of dissimilarity of respective search results.

* * * * *